(12) United States Patent
Vollmer

(10) Patent No.: US 10,907,580 B2
(45) Date of Patent: Feb. 2, 2021

(54) METHOD AND APPARATUS FOR PROVIDING EXTERNAL FUEL TO A ROCKET

(71) Applicant: John Vollmer, Bloomington, IN (US)

(72) Inventor: John Vollmer, Bloomington, IN (US)

( * ) Notice: Subject to any disclaimer, the term of this patent is extended or adjusted under 35 U.S.C. 154(b) by 109 days.

(21) Appl. No.: 16/546,232

(22) Filed: Aug. 20, 2019

(65) Prior Publication Data

US 2020/0309067 A1   Oct. 1, 2020

Related U.S. Application Data

(60) Provisional application No. 62/824,712, filed on Mar. 27, 2019.

(51) Int. Cl.
| | |
|---|---|
| *F02K 9/44* | (2006.01) |
| *B64G 1/00* | (2006.01) |
| *F02K 9/60* | (2006.01) |
| *B64G 1/14* | (2006.01) |
| *B64G 1/40* | (2006.01) |
| *F02K 9/42* | (2006.01) |

(52) U.S. Cl.
CPC ............... *F02K 9/44* (2013.01); *B64G 1/002* (2013.01); *B64G 1/005* (2013.01); *B64G 1/14* (2013.01); *B64G 1/401* (2013.01); *B64G 1/402* (2013.01); *F02K 9/42* (2013.01); *F02K 9/60* (2013.01)

(58) Field of Classification Search
CPC .......... B64G 1/002; B64G 1/005; B64G 1/14; B64G 1/401; B64G 1/402; B64G 5/00; F02K 9/42; F02K 9/44; F02K 9/60
See application file for complete search history.

(56) References Cited

U.S. PATENT DOCUMENTS

| | | | | |
|---|---|---|---|---|
| 7,004,185 | B2 * | 2/2006 | Mueller | B64F 1/28 137/1 |
| 7,131,613 | B2 * | 11/2006 | Kelly | B64B 1/20 244/171.4 |
| 2003/0037819 | A1 * | 2/2003 | Mueller | B64G 5/00 137/386 |
| 2010/0288877 | A1 * | 11/2010 | Strabala | F23C 15/00 244/1 TD |
| 2016/0340062 | A1 * | 11/2016 | Eaton | B64G 1/401 |

\* cited by examiner

*Primary Examiner* — Todd E Manahan
*Assistant Examiner* — Kyle Robert Thomas
(74) *Attorney, Agent, or Firm* — Brannon Sowers & Cracraft PC

(57) ABSTRACT

A system for providing fuel and oxidant to a rocket in flight, including a rocket having at least one internal tank for storing propellant, at least one external tank for holding a liquid rocket propellant, and at least one umbilical hose in fluidic communication with the at least one internal tank and the at least one external tank. The at least one umbilical hose is configured to automatically disengage from the rocket when the rocket reaches a predetermined state such as a predetermined altitude, for example. The at least one internal tank remains in fluidic communication with the at least one external tank while the at least one umbilical hose is engaged.

5 Claims, 5 Drawing Sheets

METHOD AND APPARATUS FOR PROVIDING EXTERNAL FUEL TO A ROCKET

TECHNICAL FIELD

The claimed novel technology relates generally to the fields of aeronautics and astronautics, and, more particularly, to a method and apparatus for providing externally-sourced fuel to a rocket during the initial ignition and liftoff stage.

BACKGROUND

Rocketry is enjoying a technological renaissance as a method of delivering personnel and machinery/payloads to the upper atmosphere and beyond. Such rockets are primarily powered by chemical, nuclear, and/or ground-based projected energy sources, with chemical propellants being the most popular. Various methods of reducing the cost per unit mass of delivering useful materials and fabricated items into space exist or are currently known. These include re-usable rocket-powered vehicles such as the now-retired NASA fleet of space shuttles, the Russian Buran, and SpaceX's Falcon series of rockets, using Merlin engines powered by kerosene/liquid oxygen. Currently, only solid and liquid-fueled chemical single or multi-stage rockets, with or without additional boosters, are in service.

There are known in the art several possible methods of decreasing rocket delivery cost, and most involve transferring energy to the rockets by increasing initial kinetic and/or potential energy before ignition of the main motors. Some ways that this can be achieved include elevation to a significant height of the rocket assembly as suspended under a disposable lighter-than-air balloon; forcible ejection at high velocity from large guns utilizing either chemical propellants or compressed fluids; piggyback transport of the rocket assembly to high altitude as attached to an airplane; transport of the rocket assembly to high altitude as towed on a cable tether behind (or attached to) an airplane; acceleration to high velocity via the use of ground-based linear induction motors or jet-powered sleds prior to ignition of the rocket's main motors. However, these systems suffer from the drawbacks of requiring another vehicle to carry the rocket at least part of the way, or imparting a tremendous amount of energy to the rocket at liftoff (via gun or rocket sled), which tends to generate an excessive level of G-force to the personnel and equipment being launched.

Another prior art method for reducing the delivery cost is the theoretical Space Elevator, wherein a large mass in geosynchronous orbit is used as the far endpoint of a tethered cable with the other end affixed to the earth. The cable, held taut by centrifugal force, is then to be used to haul carloads of persons and materials into orbit as an extremely long elevator cable. However, the main drawback of the Space Elevator idea is that there is currently no known material with anywhere close to the tensile strength required for the cable. As if this hurdle wasn't enough, a not-inconsiderable amount of energy is required to run an elevator car up and out of the Earth's gravitational field. In fact, one issue common to many of the above prior art techniques is the development of new materials and/or massive structures and are unlikely to present themselves anytime soon.

Thus, a need exists for a lighter and smaller rocket that uses less fuel to carry a greater payload into space. The present novel technology addresses this need.

DETAILED DESCRIPTION

Figure 1A:
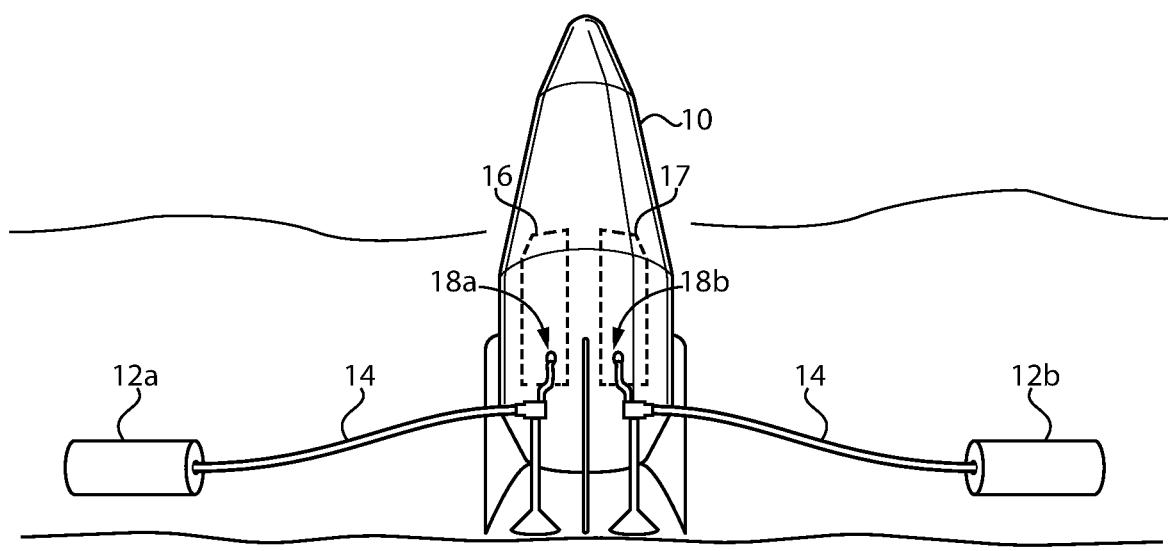
FIG. 1A is a diagrammatic view of an external rocket fueling assembly of a first embodiment of the present novel technology.
Figure 1B:
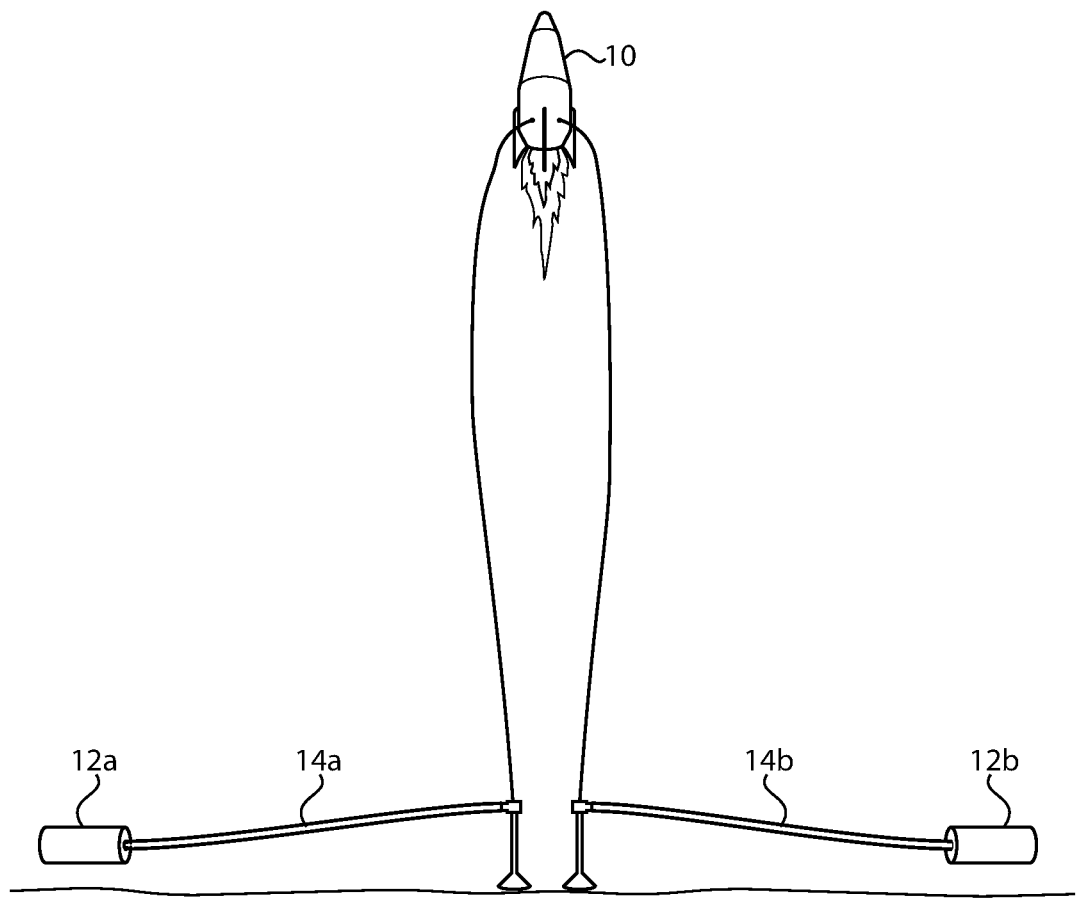
FIG. 1B diagrammatically shows the assembly of FIG. 1A with the rocket being fueled during liftoff.
Figure 1C:
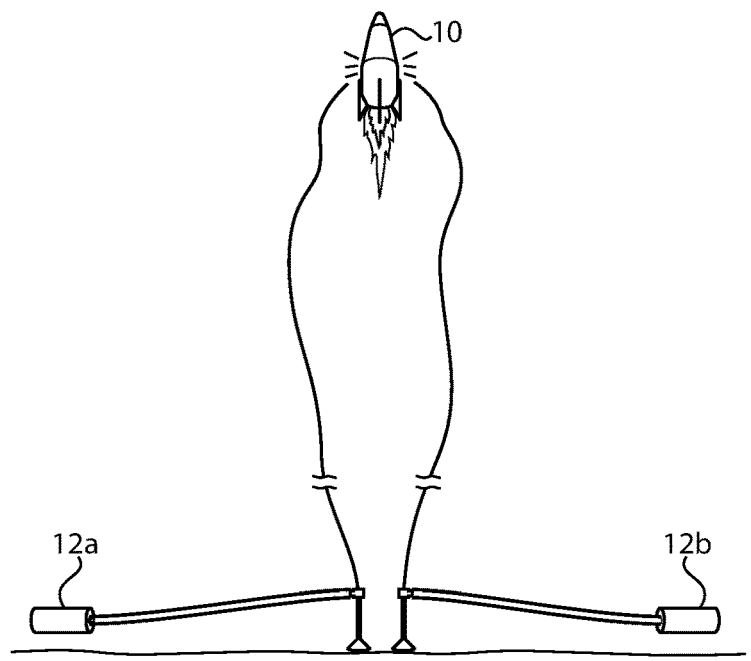
FIG. 1C diagrammatically shows the assembly of FIG. 1A with the umbilical conduits automatically disengaging when the rocket reaches a predetermined altitude.
Figure 1D:
FIG. 1D diagrammatically shows the assembly of FIG. 1A with the umbilical conduits being retracted.
Figure 1D:
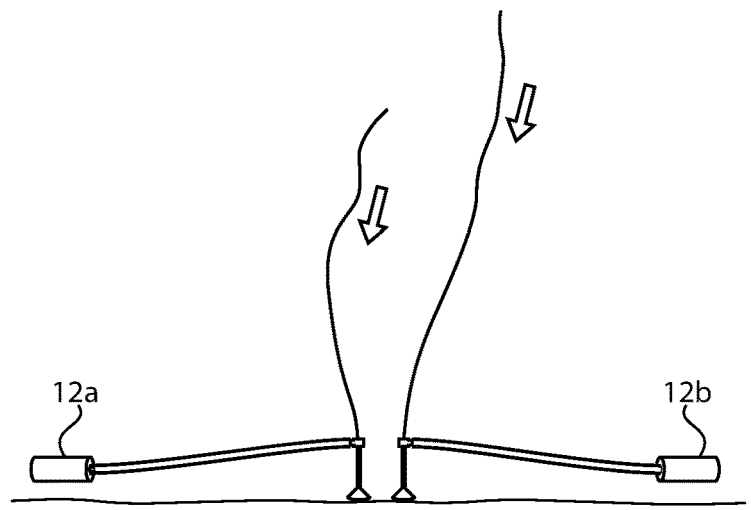

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would normally occur to one skilled in the art to which the claimed technology relates.

Figure 2A:
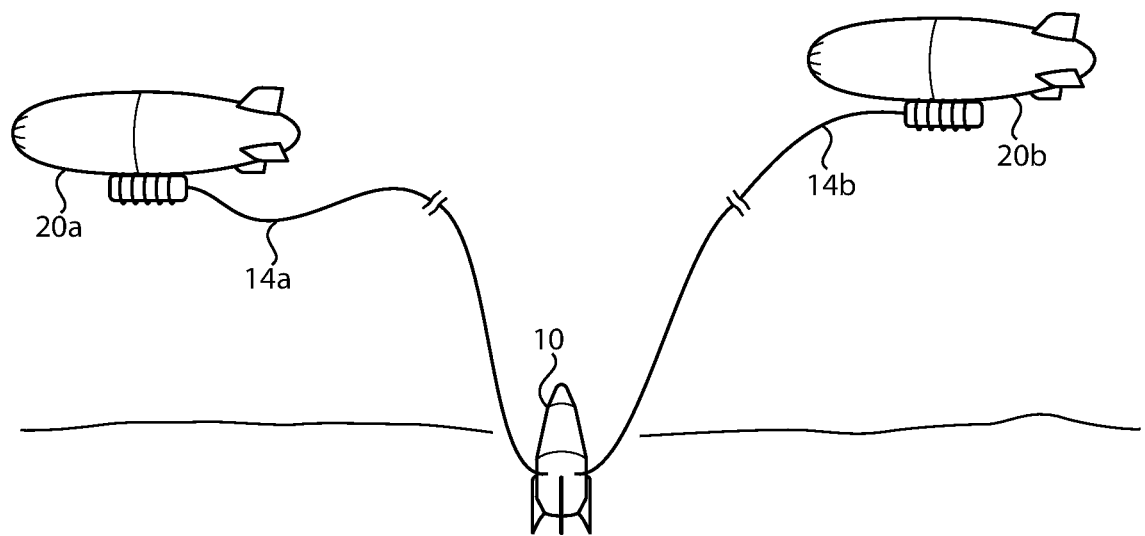
FIG. 2A is a diagrammatic view of an external rocket fueling assembly of a second embodiment of the present novel technology with the external tanks airborne.
Figure 2B:
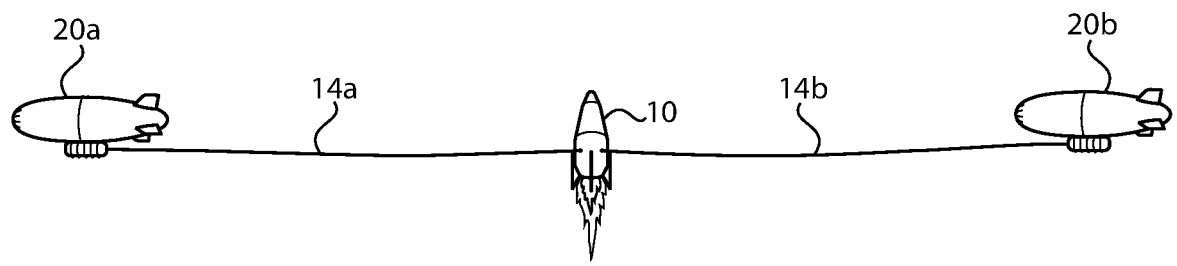
FIG. 2B diagrammatically shows the assembly of FIG. 2A with the rocket being fueled during liftoff.
Figure 2C:
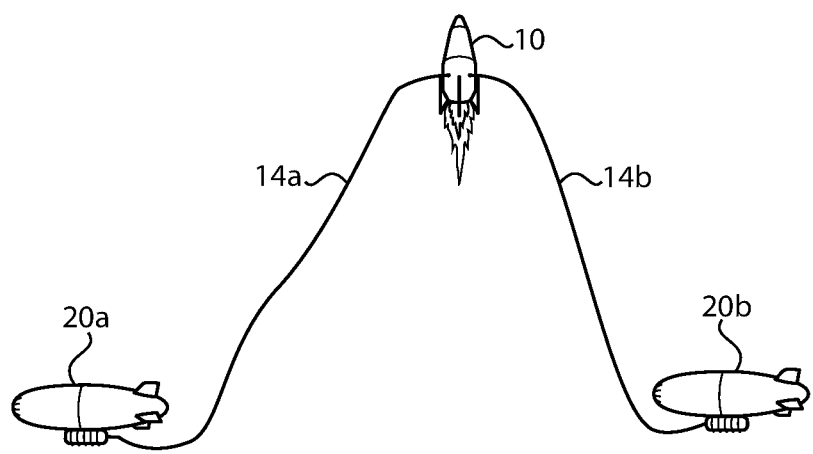
FIG. 2C diagrammatically shows the assembly of FIG. 2A with the umbilical conduits being retracted.
Figure 3:
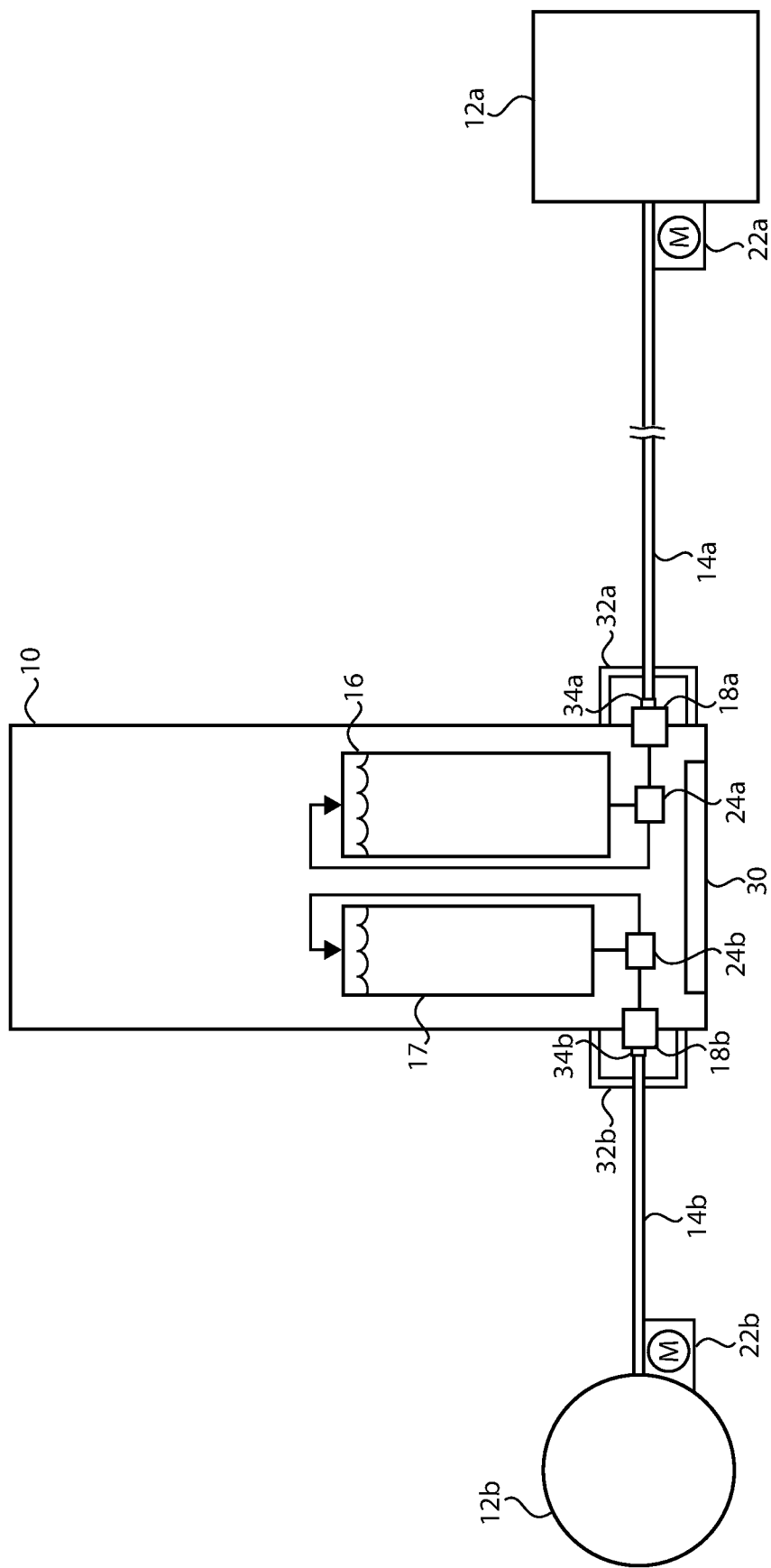
FIG. 3 is a schematic view of rocket fueling assembly of FIGS. 1A and 2A.

As shown in FIGS. 1A-3, the novel technology described and claimed herein relates to a method and system for providing liquid propellant, such as fuel and/or oxidant, to a rocket 10 during and after ignition and liftoff. In one embodiment, at least one, and more typically two or more, external tanks are connected via umbilical tubes to the rocket. Typically, a first auxiliary tank 12a containing fuel, such as liquid hydrogen, is operationally connected via a first umbilical 14a in fluidic communication with the rocket's fuel tank. Likewise, a second auxiliary tank 12b containing oxidant, such as liquid oxygen, is operationally connected via a second umbilical 14b in fluidic communication with the rocket's oxidant tank. External connections are typically made through one or more inlet ports 18a and 18b accessible from the rocket's exterior and connected in fluidic communication through one or more valve assemblies with the respective fuel and/or oxidant tanks positioned within the rocket 10. Upon ignition, the rocket's fuel and oxidant tanks will begin to deplete, establishing negative pressure within the tank and thus each respective tank will enjoy an urging force to draw fuel and/or oxidant through a respective umbilical from the ground-based auxiliary tanks. As shown in FIG. 3, fluidic connections to internal tanks in the rocket may be structured such that fuel or oxidant is fed through the rocket to enter near a top of the tank. Pumps may be connected to each respective tank to assist in the fluidic delivery of fuel and/or oxidant from each respective tank, and/or to assist in the control of flow rate through the umbilical into the respective rocket tanks.

The umbilical hoses or conduits are typically electrically and thermally insulated or made of an insulating material. More typically, the umbilical hoses are made of a material having a high strength-to-weight ratio, such as carbon fiber, carbon nanotube, graphene, graphite reinforced composite, or like material, having strength, durability, and toughness sufficient to support their own weight in addition to the weight of the fluids moving therethrough. In some embodiments, as depicted in FIGS. 1A-D, umbilicals 14a and 14b could be ground-based and feed a thin, flexible hose through an outer tube housing as the rocket ascends.

In some embodiments, a gantry is provided to help provide the umbilical(s) to the rocket and minimize drag or tension on the rocket therefrom. Gantries could be detachably mounted to the rocket itself, and automatically detached by pneumatic or explosive charge actuators, for example, or simply carried onboard throughout. In some embodiments, motors such as bi-directional electric motors are provided and operationally connected to the umbilical(s) so as to minimize and control tension and drag on the rocket as the rocket rises. The electric motors could be ground-based or carried onboard an airborne support for the external tanks, as further discussed herein. Typically, the rocket automatically disconnects from the umbilical(s) after reaching a predetermined altitude, as determined by sensors operationally connected to the rocket, such as to an electronic controller that is likewise operationally connected to the valves and to a disconnect mechanism operationally connected to each respective valve and/or umbilical. In other words, each umbilical may be automatically disconnected from the rocket once the rocket reaches a predetermined speed and/or altitude, with the electric motors reeling the umbilical(s) back in for reuse. Fluid connections between the umbilicals and the rocket itself may include anti-turbulence nozzles or other fluid conveyance structure to promote and/or maintain a more laminar flow of fluids into the rocket itself. Thus, ports 18a and 18b could be associated with anti-turbulence nozzles housed within the rocket 10 itself, of potentially positioned externally to the rocket 10.

In another embodiment, many details may be identical to those of the above-described embodiment, but for the auxiliary fuel and/or oxidant tanks being suspended at a predetermined altitude from one or more airships, such as dirigibles, 20a and 20b shown in FIGS. 2A-C. In this embodiment, fuel/oxidant is gravity fed, or gravity-assisted, through a respective umbilical 14a and 14b to the respective internal rocket tank until the rocket's altitude is equal to that of the airborne tank, after which increasing negative pressure with optional pump assist urges liquid fuel and/or oxidant into the rocket tank. Eventually, the umbilicals 14a and 14b can be disconnected, reeled in via electric motors potentially, and the dirigibles prepared for re-use. This configuration should allow for the rocket 10 to be fed auxiliary fuel and oxidant to an even higher altitude, with less energy expenditure for delivering gravity fed fuel/oxidant to the rocket. Accidental ignition of the auxiliary tanks is less problematic, as they are suspended at a significant altitude, such as between 1 and 3 kilometers (or more), during operational fueling of the ascending rocket.

The fueling operation, including pump speeds and/or take-up motor operation is controlled by an electronic controller, more typically an at least triple-redundant controller system, for safety and efficiency. An electronic controller and associated control system can be carried onboard, or ground-based.

In some embodiments, the valves and/or inlet ports are positioned near the base of the rocket to minimize the effects of drag and tension from the umbilical hoses, although the present disclosure is not thereby limited.

In each of the above embodiments, as some of the fuel and oxidant is externally supplied in transit, the rocket's internal tanks do not have to hold the total amount of fuel and oxidant required for the rocket to complete its desired journey. Thus, the rocket 10 may be designed with smaller fuel and oxidant tanks, leaving more room for payload and/or crew.

With continued reference to FIG. 3, in operation, an auxiliary fuel tank 12a without the rocket 10 is operationally connected in fluidic communication with an internal fuel tank 16 positioned within the rocket 10. Optionally, an auxiliary oxidant tank 12b without the rocket 10 is also operationally connected in fluidic communication with an oxidant tank 17 positioned on and/or within the rocket 10. Tanks 12a and 12b feed fuel and oxidant to a rocket engine 30. Gantries are shown at 32a and 32b The rocket 10 is ignited, and the launched rocket 10 is fueled by flowing fuel from the auxiliary fuel tank 12a into the internal fuel tank 16 using a first umbilical 14a and, optionally, flowing oxidant from the auxiliary oxidant tank 12b into the internal oxidant tank 17 using a second umbilical 14b. When the rocket 10 reaches a predetermined altitude and/or predetermined speed, the auxiliary fuel tank 12a is automatically disconnected from the internal fuel tank 16, and the auxiliary oxidant tank 12b is automatically disconnected from the internal oxidant tank 17. Automatic disconnection could include disengaging a fluidic coupling 34a and 34b between the umbilicals 14a and 14b and inlet ports 18a and 18b. Such disengagement could include pneumatically, hydraulically, or explosively activated decoupling, with closing valves sealing fluid openings after disengagement.

Figure 4:
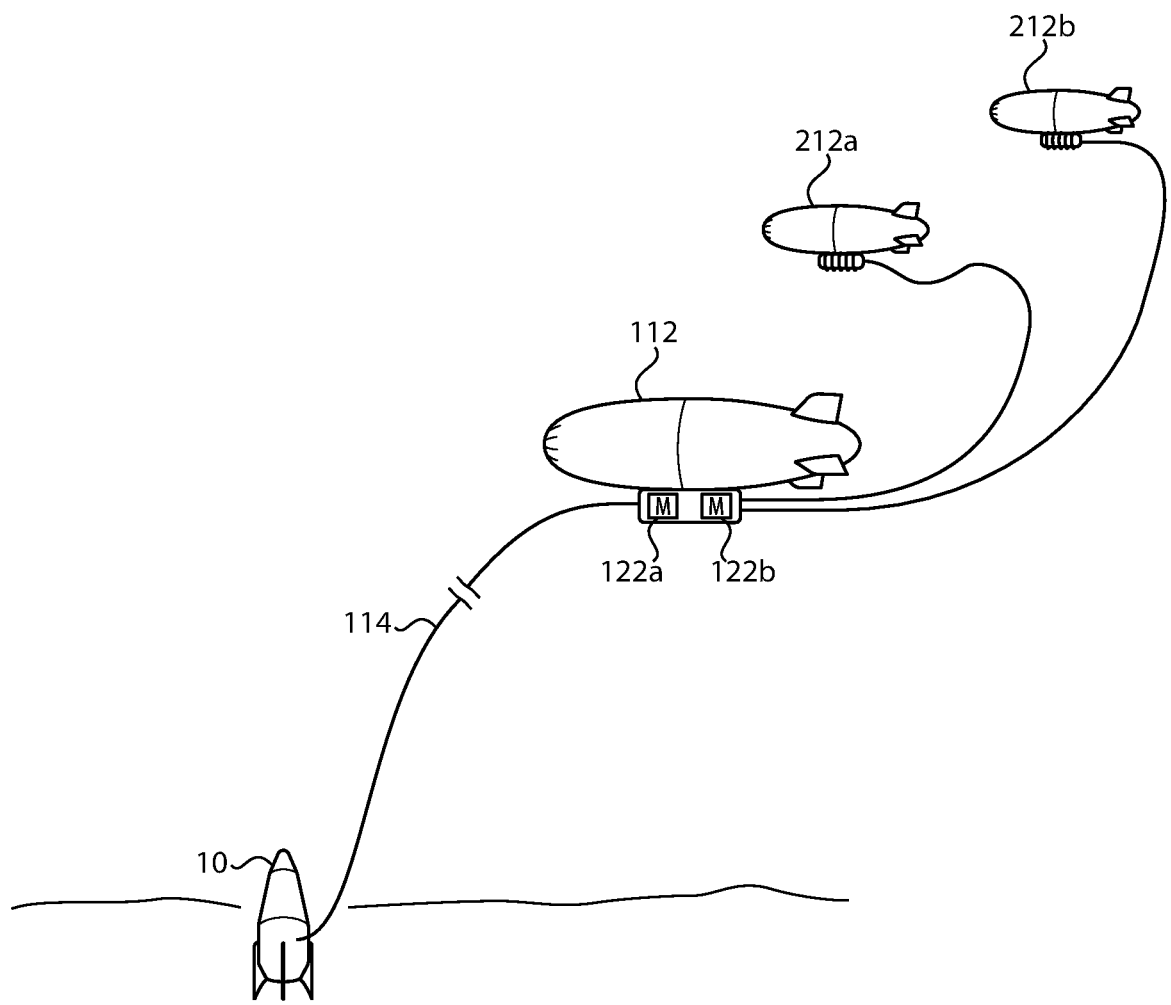
FIG. 4 is a diagrammatic view of an external rocket fueling assembly of a third embodiment of the present novel technology with the external tanks airborne.

FIG. 3 also illustrates a first electric takeup motor 22a coupled with external fuel tank 12a, and a second electric takeup motor 22b coupled with external oxidant tank 12b. As discussed above, electric takeup motors 22a and 22b might be ground-based, such as in the embodiment of FIGS. 1A-C. Electric takeup motors 22a and 22b could also be carried onboard airships 20a and 20b in the embodiment of FIGS. 2A-C. Also depicted in FIG. 3 are valves 24a and 24b, resident in rocket 10. As discussed above valves 24a and 24b could include anti-turbulence valves, assisting in providing a relatively smooth and laminar flow of the fuel and oxidant to the rocket 10, as the case may be. In still another embodiment, as depicted in FIG. 4, fuel and oxidant delivery could be by way of multiple airships, with a first airship 212a carrying fuel, a second airship 212b carrying oxidant, and a main airship 112 including apparatus for conveying the fuel and oxidant to the rocket 10 during flight. The purpose of main airship 112 could be to carry a first takeup motor 122a and a second takeup motor 122b, each associated with an umbilical hose conveying fuel or oxidant. In FIG. 4, a single umbilical conduit 114 is shown extending between main airship 112 and the rocket 10, however, it will be appreciated that conduit 114 could in fact be two separate conduits coupled together in parallel, although the present disclosure is not thereby limited in this regard. In the embodiment of FIG. 4, the system would function generally analogously to other embodiments disclosed herein, including the embodiment of FIG. 2A-C, except that additional airships can be dedicated in service to carrying the fuel and oxidant, with the main airship 112 being dedicated to carrying the necessary apparatus for feeding and controlling the feed of umbilicals conduit 14.

Those skilled in the art will be familiar with the general challenges relating to fueling rockets, including the necessity of carrying a relatively large volume in weight of fuel and typically oxidant onboard. Because a majority of the weight of a rocket at lift off can be the fuel and oxidant carried onboard, rockets have heretofore been constructed that are exceptionally large and among the largest manmade structures constructed. In accordance with the present disclosure, it is believed that rockets can be made vastly smaller, or maintained at some size with additional capacity for cargo, personnel, et cetera, that would have previously been dedicated to fuel and oxidant. In view of the teachings herein, it will be appreciated that external supply of fuel and oxidant, including with airships or in ground-based systems, provides an attractive alternative. Ground-based tanks for fuel and oxidant can of course be made as large as desired, at least theoretically, and could include fuel and oxidant sufficient for multiple rocket launches. In a generally analogous manner, there are few theoretical limits on the size of an airship. Embodiments are contemplated where a single large airship, or multiple airships such as that depicted in FIG. 4, are situated in the vicinity of a rocket launch pad and can be attached to and detached from numerous rockets launched in relatively close succession to one another. In some instances, the airship or airships can be maintained at a more or less constant altitude, essentially parked for service. In other instances, the airships could be raised or lowered, moved toward or away from a rocket, et cetera, consistent with the size of the rocket, launch and fueling objectives, and other factors.

While the claimed technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. For instance, while the present description includes an airborne (dirigible) strategy, for external fueling, in other instances systems could include aspects of both general approaches, such as external fueling for a first part of a rockets ascent being ground-based, the dirigible-based once the ground-based feeds become out of range, then finally external fueling disconnected altogether. Accordingly, it is understood that all changes and modifications that come within the spirit of the claimed technology are desired to be protected.

What is claimed is:

1. A system for providing fuel and oxidant to a rocket during and after ignition and liftoff from the ground, comprising:
    the rocket located on the ground having at least one internal fuel tank for storing fuel and at least one internal oxidant tank for storing oxidant;
    at least one external tank for holding fuel or oxidant;
    at least one umbilical hose engaged with the rocket connected to and in fluidic communication with the at least one external tank;
        wherein the at least one umbilical hose is configured to automatically disengage from the rocket when the rocket reaches a predetermined altitude from the ground;
    wherein the at least one internal fuel tank and/or the at least one internal oxidant tank remains in fluidic communication with the at least one external tank while the at least one umbilical hose is engaged; and
    wherein the at least one external tank is connected to at least one airship and is airborne.

2. The system of claim 1 and further comprising at least one electric motor operationally connected to the at least one umbilical hose for retrieving the at least one umbilical hose to the at least one airship, and the at least one umbilical hose extends from the at least one external fuel tank to the rocket.

3. A method of fueling a rocket during and after launch, comprising the steps in sequence:
    a) operationally connecting an airborne auxiliary fuel tank in fluidic communication with an internal fuel tank within the rocket and an airborne auxillary oxidant tank in fluidic communication with an internal oxidant tank within the rocket while the rocket is upon the ground, wherein the auxiliary fuel tank and the auxiliary oxidant tank are not within the rocket;
    b) igniting the rocket upon the ground to yield a launched rocket lifted off from the ground;
    c) fueling the launched rocket by flowing fuel from the airborne auxiliary fuel tank into the internal fuel tank; and
    d) automatically disconnecting the airborne auxiliary fuel tank from the internal fuel tank.

4. The method of claim 3, wherein the auxiliary fuel tank is on an airship.

5. The method of claim 3, and further comprising:
    a) fueling the launched rocket by flowing oxidant from the auxiliary oxidant tank into the internal oxidant tank; and
    b) automatically disconnecting the auxiliary oxidant tank from the internal oxidant tank.

\* \* \* \* \*